United States Patent Office 3,063,806
Patented Nov. 13, 1962

3,063,806
PROCESS FOR THE PRODUCTION OF
ANHYDROUS HYDRAZINE
Günter Henrich, Opladen, Germany, assignor to Farbenfabriken Bayer Aktiengesellschaft, Leverkusen, Germany, a corporation of Germany
No Drawing. Filed Dec. 15, 1959, Ser. No. 859,578
Claims priority, application Germany Dec. 18, 1958
7 Claims. (Cl. 23—190)

The present invention relates to an improved process for the production of anhydrous hydrazine.

Using a fractional distillation procedure, dilute aqueous solutions of hydrazine can only be concentrated to a hydrazine content of about 68% since a water-hydrazine mixture with this composition passes over azeotropically upon further distillation. A number of processes are known, with which anhydrous hydrazine is produced from hydrazine hydrate by dehydration with the aid of strong bases, for example sodium hydroxide. The common and characteristic feature of these processes is that such a quantity of caustic soda is added to the aqueous hydrazine solutions that at least one mol of base is present for each mol of water to be combined. The separation of the hydrazine from concentrated liquor is in principle effected by subsequent distillation. In more recent processes, inert hydrocarbons are also added during this distillation in order to avoid danger from explosive decomposition during distillation.

These processes have the great disadvantage that the complete removal of the water from the aqueous hydrazine solutions only takes place with the simultaneous formation of alkali metal hydroxide monohydrate, for example sodium hydroxide monohydrate $NaOH.H_2O$, since otherwise no complete combining of the water is possible in the subsequent distillation. The result of this is that all parts of the apparatus and all pipes, fittings and the like must be at least at the temperature of the melting point of this monohydrate, during the process, i.e. 64° C. with, for example, $NaOH.H_2O$. This is very detrimental to the usefulness of the process, since even with a brief interruption, there is the danger that the pipes and fittings may become clogged and necessitate quite complicated cleaning operations. Furthermore, the circulation of such highly concentrated caustic solutions presents considerable difficulties because of their aggressive nature.

A further consequence of the necessary high alkali metal hydroxide concentration is that the caustic alkali used must be dehydrated before being re-employed, in most cases until the caustic alkali is practically anhydrous, in order that it is not necessary to circulate a very large quantity of concentrated caustic solution.

According to the present invention it has been found that practically anhydrous hydrazine is obtained from aqueous hydrazine solution by adding an alkali metal hydroxide to the aqueous hydrazine solution, extracting the hydrazine from this mixture with an aromatic amine, such as aniline, a toluidine or a xylidine, advantageously at elevated temperature, such as 60 to 80° C., separating the extract from the aqueous solution and separating the hydrazine from the extract, preferably by distillation. Under these circumstances, it is possible to effect the separation of the hydrazine from water with substantially lower alkali metal hydroxide concentrations than when using prior known processes. Whereas always at least 1 mol of sodium hydroxide had to be used to each mol of the water to be combined, it is a surprising fact that substantially smaller quantities of sodium hydroxide are sufficient for the same purpose when using the process according to the present invention.

It has been found that by a suitable choice of the extraction agent and extraction conditions, 0.1 mol and less of sodium hydroxide per mol of water to be combined can be adequate, even although this necessitates large extraction devices on account of the low distribution ratio. The hydrazine can be extracted conveniently and economically if 0.2 to 0.5 mol of an alkali metal hydroxide is present during the extraction to each mol of water which is to be combined. The use of such a substantially lower alkali metal hydroxide concentration has the result that the entire process, including the concentration of the alkali metal hydroxide, can be carried out with a caustic solution which is liquid at room temperature.

Extraction agents suitable for use in the process according to the invention, are aromatic amines such as the toluidines and xylidines, but more especially aniline. The arylamines have the advantage that they are practically insoluble in the concentrated alkali solution and do not have to be removed therefrom by complicated methods.

If the extraction apparatus available for the process of the present invention does not have the sufficient number of separation stages in order to bring the hydrazine content of the aqueous phase to a negligibly small value, so that a small proportion of hydrazine remains in the alkali metal hydroxide, this proportion can be recovered by adding an equivalent quantity of acetone. By this means, all the remaining hydrazine is separated out in the form of acetone hydrazone which is insoluble in alkalies and which can be worked up to yield dihydrazine sulphate.

The extraction can take place at the temperature at which the participating phases are liquid, although better results are produced at an elevated temperature of 60 to 80° C.

If the organic phase, after extraction, still contains traces of water which would result in the hydrazine obtained still containing water, these traces can be very easily removed by incorporating a small quantity of caustic alkali in powder form and thereafter separating it out by filtration. This quantity of caustic alkali can be used for compensating for certain leakage losses, for example in the caustic alkali circulation.

The subsequent separation of the hydrazine from the extraction agent is effected by fractional distillation, in which the hydrazine is recovered as top product in anhydrous form, while the extraction agent forming as a sump product can be returned to the process.

The invention is further illustrated by the following examples without being restricted thereto.

*Example*

500 ml./h. of 64% $N_2H_4$-solution in water (corresponding to 100% hydrazine hydrate) are mixed with 1300 ml./h. of 50% NaOH and extracted in a 4-stage countercurrent extraction apparatus with 4000 g./h. of aniline at a temperature of 70 to 80° C. The discharging solution still contains 0.91% of hydrazine and the aniline extract 7.0% of hydrazine. The extract is thereafter vigorously mixed with 50 g. of powdered caustic soda and the latter is filtered off. The extract is then introduced for distillation purposes into the lower half of a separating column, which has a heated flask and a condenser with return pipe. By means of the heating, at the top of the column a return flow ratio of 2.5 parts of return flow to 1 part of distillate removal is maintained and, with a temperature of 113.5° C. at the top of the column, it is possible to withdraw 300 g. of distillate with a content of 97.1% $N_2H_4$. The aniline discharging into the sump still contains 0.09% $N_2H_4$.

24.5 g. of acetone are added to the extracted sodium hydroxide solution and about 30 g. of acethydrazone are separated therefrom as an oil.

Thereafter, this caustic solution, which now does not contain any valuable distillable constituents, is concentrated in a through-flow evaporator to 40% to 50% and used again for alkalization of the hydrazine.

I claim:

1. Method for the preparation of substantially anhydrous hydrazine from aqueous hydrazine solutions, said method comprising the steps of adding an alkali metal hydroxide to the aqueous hydrazine solution in an amount of about 0.1 to 0.5 mol of alkali metal hydroxide for each mol of water present, extracting the solution thereby produced with an aromatic amine whereby said hydrazine is removed from the aqueous solution into said aromatic amine and recovering the hydrazine therefrom.

2. Method according to claim 1, wherein said aromatic amine is a member selected from the group consisting of toluidine, xylidines and aniline.

3. Method according to claim 1, which comprises effecting said extraction at a temperature of from about 60 to about 80° C.

4. Method according to claim 1, which comprises additionally adding solid alkali metal hydroxide to said aromatic amine containing hydrazine to thereby separate out any water contained therein, and thereafter removing the solid alkali metal hydroxide.

5. Method according to claim 1, which comprises adding to the separated alkali metal hydroxide solution containing minor amounts of hydrazine an equivalent amount of acetone, separating the acetone hydrazine thereby precipitated from said solution and recovering hydrazine therefrom.

6. The method for the preparation of substantially anhydrous hydrazine from aqueous hydrazine solutions, said method comprising the steps of adding an alkali metal hydroxide in an amount of from about 0.2 to about 0.5 mol of alkali metal hydroxide for each mol of water present, extracting the solution thereby produced with an aromatic amine whereby said hydrazine is removed from the aqueous solution into said aromatic amine, and recovering the substantially anhydrous hydrazine therefrom.

7. The method for the preparation of substantially anhydrous hydrazine from aqueous hydrazine solutions, said method comprising the steps of adding sodium hydroxide to the aqueous hydrazine solution in an amount of about 0.1 to 0.5 mol of sodium hydroxide for each mol of water present, extracting the solution thereby produced with aniline at a temperature of from 70° to 80° C. whereby said hydrazine is removed from the aqueous solution into said aniline, and recovering the hydrazine therefrom by distillation.

References Cited in the file of this patent

UNITED STATES PATENTS 2,698,286     Bircher _____ Dec. 28, 1954

FOREIGN PATENTS 584,845     Canada _____ Oct. 13, 1959

OTHER REFERENCES

Audrieth and Ogg: "The Chemistry of Hydrazine," John Wiley and Sons, Inc., New York, N.Y., 1951, page 44.

UNITED STATES PATENT OFFICE
CERTIFICATE OF CORRECTION

Patent No. 3,063,806                 November 13, 1962

Günter Henrich

It is hereby certified that error appears in the above numbered patent requiring correction and that the said Letters Patent should read as corrected below.

In the heading to the printed specification, line 8, for "Dec. 18, 1958" read -- Dec. 16, 1958 --.

Signed and sealed this 30th day of April 1963.

(SEAL)
Attest:

ERNEST W. SWIDER
Attesting Officer

DAVID L. LADD
Commissioner of Patents